United States Patent
Hamrick et al.

(10) Patent No.: US 6,466,653 B1
(45) Date of Patent: Oct. 15, 2002

(54) TEXT-TO-SPEECH PREPROCESSING AND CONVERSION OF A CALLER'S ID IN A TELEPHONE SUBSCRIBER UNIT AND METHOD THEREFOR

(75) Inventors: Mendel Kieth Hamrick, Algonquin; Kelly Ann Multach, Lake in the Hills; Elizabeth Marie Hart, Lake Zurich; Kevin D. Kaschke, Hoffman Estates; Robert Wesley Bossemeyer, St. Charles; Mary Louise Hardzinski, Palatine; Thomas Joseph McBlain, Arlington Heights, all of IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/391,425

(22) Filed: Sep. 8, 1999

Related U.S. Application Data (63) Continuation-in-part of application No. 09/240,522, filed on Jan. 29, 1999.

(51) Int. Cl.[7] .......................... H04M 1/64; H04M 11/00; H04M 1/56
(52) U.S. Cl. ................ 379/67.1; 379/88.07; 379/88.12; 379/88.16; 379/93.15; 379/100.13
(58) Field of Search ...................... 379/67.1, 76, 88.01, 379/88.02, 88.07, 88.08, 88.13, 88.16, 93.15, 93.34, 100.13, 88.12; 704/260, 261, 266, 270, 275, 277, 258; 455/433, 461, 462, 552, 420, 532, 426, 403

(56) References Cited

U.S. PATENT DOCUMENTS

| | | | |
|---|---|---|---|
| 4,894,861 A | | 1/1990 | Fujioka |
| 4,899,358 A | | 2/1990 | Blakley |
| 5,007,076 A | * | 4/1991 | Blakely ...................... 379/67.1 |
| 5,289,530 A | | 2/1994 | Reese |
| 5,526,406 A | * | 6/1996 | Luneau ......................... 379/61 |
| 5,572,575 A | * | 11/1996 | Yamamoto et al. ......... 455/412 |
| 5,634,084 A | * | 5/1997 | Malsheen et al. ........... 704/260 |
| 5,646,979 A | | 7/1997 | Knuth |
| 5,883,942 A | | 3/1999 | Lim et al. |
| 5,949,865 A | * | 9/1999 | Fusinato ..................... 379/207 |
| 6,028,921 A | * | 2/2000 | Malik et al. ................ 379/201 |
| 6,038,443 A | * | 3/2000 | Luneau ........................ 455/414 |
| 6,061,718 A | * | 5/2000 | Nelson ........................ 709/206 |
| 6,141,341 A | * | 10/2000 | Jones et al. ................ 370/352 |
| 6,154,650 A | * | 11/2000 | Abidi et al. ................ 455/433 |

OTHER PUBLICATIONS

Ameritech Model AM–2000 50 Memory Caller ID with name & Number Owner's Manual.

* cited by examiner

Primary Examiner—Allan Hoosain
(74) Attorney, Agent, or Firm—Brinks Hofer Gilson & Lione (57) ABSTRACT

A telephone subscriber unit (22) includes a caller identification device (120), a memory unit (114), a pre-processor (124) and a text-to-speech synthesizer (TTS) (110). The caller identification device (120) receives caller ID information of a calling party in a first textual format and stores the caller ID information in the memory unit (114) The pre-processor (124) converts textual caller ID information from the first data format to a second data format suitable for text-to-speech synthesis by the text-to-speech synthesizer (110). The text-to-speech synthesizer (110) generates audible caller ID information responsive to receiving the textual caller information.

7 Claims, 5 Drawing Sheets

TEXT-TO-SPEECH PREPROCESSING AND CONVERSION OF A CALLER'S ID IN A TELEPHONE SUBSCRIBER UNIT AND METHOD THEREFOR

CROSS-REFERENCE TO A RELATED APPLICATION

The present patent application is a continuation-in-part of patent application Ser. No. 09/240,522 filed on Jan. 29, 1999 and assigned to the assignee of the present invention.

FIELD OF THE INVENTION

The present invention relates generally to telecommunications, and more particularly to text-to-speech preprocessing and conversion of a caller's identification (ID) in a telephone subscriber unit and method therefor.

BACKGROUND OF THE INVENTION

Telecommunications systems include a telephone network and telephone subscriber units. The following patents disclose telephone networks or telephone subscriber units that incorporate text-to-speech synthesizers for generating audible caller information from textual data.

U.S. Pat. No. 5,796,806 discloses an advanced intelligent network (AIN) that incorporates text-to-speech technology for presenting spoken caller information to subscribers. In this network, caller ID information, such as the caller's name and number, ordinarily presented visually to a subscriber using a special display device, is synthesized to voice information that is audibly presented to the subscriber. The textual caller information provided to the text-to-speech synthesizer is stored in phonebook-like databases. A problem not addressed by this patent is the format mismatch between the caller information databases and the input strings to the text-to-speech synthesizer. The phonebook-like textual databases are not optimized to be used as text-to-speech input. Generally, caller information in these databases is abbreviated and truncated into a compact format to reduce storage requirements. Consequently, providing compacted caller information directly to a text-to-speech synthesizer can compromise the quality of the audible output. Hence, in a network there is a need for a spoken caller identification system that improves audible output by accounting for the formatting differences between caller databases and commercially available text-to-speech synthesizers.

U.S. Pat. No. 5,646,979, invented by Kunth, discloses a cordless telephone including a base unit, having a caller identification unit and a speech synthesizer, and a handset, having a speaker. The caller identification unit detects the presence of caller information, including a caller's telephone number, in an incoming telephone call while the telephone is ringing. The speech synthesizer converts the caller's telephone number to a synthesized speech signal and transmits the synthesized speech signal to the speaker. The speaker converts the synthesized speech signal into an audible voice announcement of the calling party's telephone number in real time during the reception of the telephone call. However, this patent does not disclose text to speech conversion of a calling party's name for voice announcement of the calling party's name during the reception of the telephone call. Therefore, if the party, receiving and incoming telephone call and hearing the audible voice announcement of the calling party's telephone number, does not recognize the calling party's telephone number, then the audible voice announcement offers little useful information to the receiving party.

U.S. Pat. No. 5,526,406, invented by Luneau, discloses a calling party announcement apparatus detects an incoming caller line identification (ICLID) number in an incoming telephone call while a telephone is ringing. A database contains names associated with various ICLID numbers or a group of ICLID numbers to be compared to the detected ICLID number. If the ICLID number is not provided by the telephone company, is marked as unlisted, or is from outside the calling area, then an announcement circuit announces "unidentified caller," "private caller," or "out of area," respectively. If the comparison yield no matches, then the announcement circuit announces the detected ICLID number, which is typically the caller's telephone number. If the comparison yield a match, then the announcement circuit announces the name corresponding to the detected ICLID number. The announcement circuit makes the announcement over a telephone receiver after the called party has answered the telephone, but before the call is answered by the telephone company. Then, the called party can elect to accept or reject the call before the telephone company central office has connected the two parties together. However, this patent does not disclose a calling party's name being sent by the telephone company to be converted into speech during the reception of the telephone call. Therefore, as this patent discloses, if the detected ILCID number does not match one of the ILCID number, having a corresponding name, in the database, then no name is announced. Further, creating the personal database requires a fair amount of work to enter and maintain the numbers and names, which is typically undesirable.

U.S. Pat. No. 4,899,358, invented by Blakley, discloses a telephone network having a call announcement arrangement that obtains a calling party's name from a database search and uses a text-to-speech unit to generate speech signals for transmission to a called communication station. The calling party's name is spoken at the station instead of being displayed. For a conventional analog station, the name is spoken after the called party has answered in response to ringing at the station but before a connection is completed to the caller. The called party accepts the caller either by remaining off-hook or by transmitting a connection signal using, for example, flash or tone signaling. For other illustrative station equipment such as an ISDN speakerphone or a specially adapted analog speakerphone, the calling party name is spoken before the called party answers in place of or in addition to normal ringing. Caller-identifying speech signals are also transmitted to a station determined to be busy to announce the caller name for a call waiting call. However, this patent does not disclose text-to-speech conversion of a calling party's name by equipment associated with the called communication station. Therefore, the called party is dependent upon the telephone network to provide the voice announcement of the calling party's name.

U.S. Pat. No. 5,289,530, invented by Reese, discloses a telephone system for remotely obtaining from a selected local telephone station audible synthesized speech representative of directory telephone numbers and/or names of previous callers stored digitally or alphanumerically in a data memory of a Caller identification (ID) interface unit at the local telephone station. The stored directory telephone numbers and/or names were previously sent to the local telephone station from terminating central office Stored Program Controlled Switching (SPCS) equipment responsive to the telephone line of the local telephone station having Caller ID service and/or other Custom Local Area Signaling System (CLASS) services which discloses a calling party directory telephone number and/or name to a called party. An apparatus, such as a telephone station set or a separate stand-alone unit connected to the telephone station set, and method are also disclosed for recalling the stored directory telephone numbers and/or names from the data memory of the Caller ID interface unit and converting the directory telephone numbers and/or names into a form which can be processed by a speech generator, for receiving the directory telephone numbers and/or names to the speech generator which converts logic signals of the directory telephone numbers and/or names into sounds to audible synthesized speech, and for communicating the audible speech to a calling customer at a remote telephone station, in response to a predetermined command code keyed-in on the remote telephone station keypad by the calling customer. However, this patent does not disclose that the speech processor converts the logic signals of the directory telephone numbers and/or names to audible synthesized speech in real time during the reception of the telephone call for listening to by the called party near the local telephone station. Therefore, the called party can only receive the audible synthesized speech of the directory telephone numbers and/or names from a remote telephone station after the incoming call was been detected and stored.

U.S. Pat. No. 4,894,861, invented by Fujioka, discloses a communication network that sends an originating party's telephone number to a terminal of a terminating party' when setting up an incoming call to the terminal. The terminal detects the originating party's telephone number. The terminal pre-registers a plurality of telephone numbers from whom incoming calls are anticipated and ID information corresponding to each of the telephone number. When the detected party's telephone number matches with one of the registered telephone numbers when the incoming call is generated, a speech generator provides an audible indication of the ID information corresponding to the matched registered telephone number. However, as with U.S. Pat. No. 5,526,406 described hereinabove, this patent does not disclose a calling party's name being sent by the telephone company to be converted into speech during the reception of the telephone call. Therefore, as this patent discloses, if the detected telephone number does not match one of the pre-registered telephone numbers, having corresponding ID information, in the database, then no ID information is announced. Further, creating the personal database requires a fair amount of work to enter and maintain the numbers and names, which is typically undesirable.

U.S. Pat. No. 5,883,942, invented by Lim et al., discloses: "A caller-ID device and/or an integrated caller-ID and answering machine device which is configurable 1) to play a pre-recorded announcement for the user when the caller-ID information received over the PSTN corresponds to stored information indicating an important caller; 2) to play a pre-recorded "block-the-blocker" outgoing message for the caller when a blocked-caller-ID code is received; and/or 3) to play a pre-recorded "reject call" outgoing message for the caller when the caller-ID information corresponds to stored information indicated an undesirable caller. The caller-ID information includes the caller's name, the caller's phone number, the date of the call and the time of the call. However, this patent does not disclose text to speech conversion of a calling party's name and/or phone number for voice announcement of the calling party's name and/or phone number in real time during the reception of the telephone call. Therefore, the called party must pay special attention to look at the caller-ID information displayed on the caller-ID device to see who is making the incoming call.

Further, a problem not addressed in all of the above patents is the format mismatch between caller ID information displayed on a caller ID subscriber unit and desirable input signals for a text-to-speech synthesizer. The phonebook-like textual display of caller ID information is not optimized for use as text-to-speech input. Generally, the caller ID information displayed is abbreviated and truncated into a compact format because to reduce storage requirements in the telephone network and in the caller ID subscriber unit and to reduce the display size in the caller ID subscriber device. Further, sometimes the caller ID information displays a calling party's name adjacent to a calling party's telephone number on a single display line in a compact format. Consequently, providing compacted displayed caller ID information directly to a text-to-speech synthesizer can compromise the quality of the audible output or produce unintended pronunciations. Accordingly, in a telephone subscriber unit there is a need for text-to-speech preprocessing and conversion of a caller's ID information, such a caller's name with or without the caller's telephone number.

DETAILED DESCRIPTION OF A PREFERRED EMBODIMENT

As an overview, present application describes two embodiments of the present invention. The first embodiment of the present invention provides a solution to the aforementioned problems in a telephone network and the second embodiment of the present invention provides a solution to the aforementioned problems in a telephone subscriber unit. In the cross-referenced parent patent application having Ser. No. 09/240,522, the first embodiment of the present invention is the preferred solution. In the present application, the second embodiment is the preferred solution.

In accordance with the first embodiment of the present invention, the quality of the audible caller information is enhanced by reformatting textual data from a pre-existing caller database so as to improve the text-to-speech synthesis process. According to one aspect of the first embodiment, a pre-processor converts existing textual caller information from a first predetermined data format stored in a conventional manner to a second data format suitable for text-to-speech synthesis. In addition to improving the quality of the audible output, the pre-processor also permits pre-existing caller information databases, such as a caller ID with name (CNAM) database, to be used with commercially available text-to-speech synthesizers. The pre-processor eliminates the need to create redundant databases of caller information formatted for a particular text-to-speech synthesizer. Another advantage of the first embodiment is that it provides a system and method that permits higher quality audible caller information to be provided to a subscriber during a call-waiting process.

In accordance with the second embodiment of the present invention, the quality of the audible caller information is enhanced by preprocessing caller ID information received as textual data by reformatting the textual data to improve the text-to-speech synthesis process. According to one aspect of the second embodiment, a pre-processor converts received textual caller ID information from a first predetermined data format to a second data format suitable for text-to-speech synthesis. In addition to improving the quality of the audible output, the pre-processor also permits pre-existing caller ID subscriber devices to be used with commercially available text-to-speech synthesizers. The pre-processor eliminates the need to design a particular data interface to transfer caller ID information received in a particular format to a particular text-to-speech synthesizer.

Figure 1:
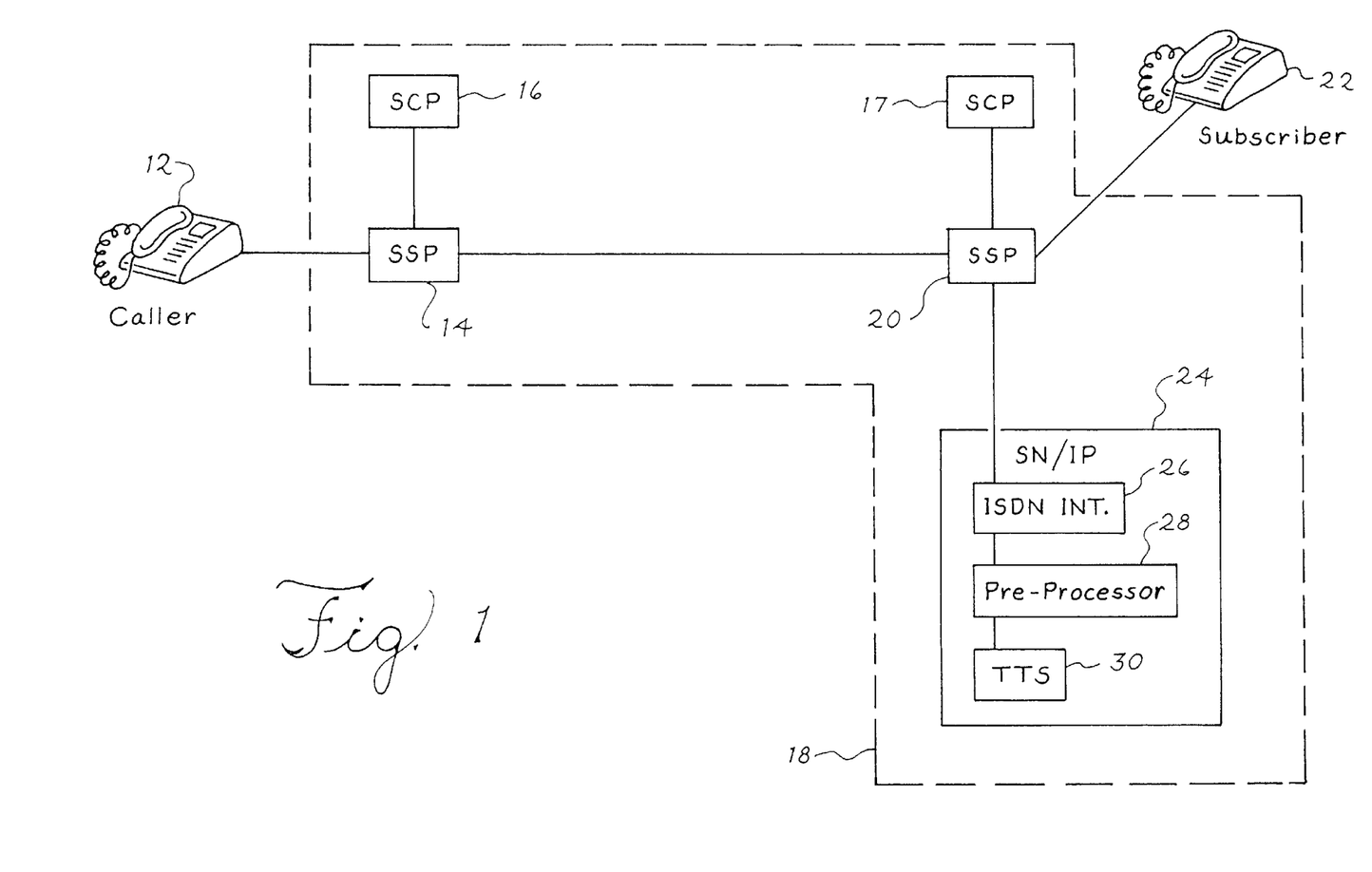
FIG. 1 illustrates a block diagram of a telecommunications system, including a telephone network and telephone subscriber units, in accordance with a first embodiment of the present invention.

Referring now to the figures, FIG. 1 illustrates a block diagram of a telecommunications system, including a telephone network 18 and telephone subscriber units 12 and 22, in accordance with the first embodiment of the present invention. The telephone network 18 generally includes remote service switching points (SSP) 14 and 20, remote service control points (SCP) 16 and 17, and a service node/intelligent peripheral (SN/IP) 24. The telephone subscriber units 12 and 22 generally include a caller terminal unit 12 and a subscriber terminal unit 22.

In the first embodiment, the telecommunication system 10 illustrates the system for providing improved audible caller information in an advanced intelligent network (AIN) implementation of a public switch telephone network (PSTN) 18. The system 10 includes the caller terminal unit 12, such as a telephone or the like, in communication with the remote service switching point (SSP) 14. The remote service control point (SCP) 16 database server provides routing and addressing information to the remote SSP 14. The SCP 16 and SSP 14 communicate using a standard interface protocol, such as signaling system 7 (SS7).

The subscriber terminal unit 22 is coupled to a subscriber SSP 20. A local SCP 17 provides routing and addressing information to the local SSP 20. Communicating with the subscriber SSP 20 is a service node/intelligent peripheral (SN/IP) 24. The functionality of the remote and subscriber SSPs 14, 20 as disclosed herein can be implemented using any AIN compatible switch such as a 5ESS switch, manufactured by Lucent Technologies, Inc.

The SN/IP 24 can be a computer or communication server linked via an open interface to the subscriber SSP 20. In the example shown, the SSP 20 and the SN/IP 24 communicate via an integrated services digital network (ISDN) connection. The ISDN link can be implemented using either ISDN-BRI (Basic Rate Interface) or ISDN-PRI (Primary Rate Interface) protocols, which are known in the art.

The SN/IP 24 can alternatively be connected to another SSP, such as the remote SSP 14, in communication with the subscriber SSP 20.

The SN/IP 24 contains and manages resources required to offer services and service enhancements to network users. Generally, the SNIP 24 may be used to combine advanced speech technologies and computer telephony integration (CTI) capabilities in a single platform that can be used as a network resource. The services provided by the SN/IP 24 can include speech recognition, voice or fax store and forward, dual-tone multi-frequency (DTMF) recognition with external telephony resources, text-to-speech synthesis, and the like. A compact service node (CSN) as manufactured by Lucent Technologies, Inc., can be used to provide the functionalities of the SN/IP 24 disclosed herein.

The SN/IP 24 includes an ISDN interface 26, a pre-processor 28, and a text-to-speech synthesizer (TTS) 30. The ISDN interface 26 and TTS 30 are customarily available with conventional SN/IPs, such as the Lucent CSN. In the first embodiment of the present invention, the pre-processor 28 can be a software program executed by the SN/IP 24 to convert textual caller information received from the ISDN interface 26. Caller information is received in a first data format and then converted into a second data format, which is then provided to the TTS 30. Using the Lucent CSN, the pre-processor 28 can be implemented using Lucent's Service Logic Language (SLL) and Service Creation Environment (SCE), available with the CSN. In addition, the CSN includes libraries of software functions and drivers that allow the software routines of the pre-processor 28 to readily access SN/IP resources, such as the ISDN interface 26 and TTS 30.

It will be apparent to one of ordinary skill in the art that the pre-processor 28 can be equivalently implemented using only hardware components or any combination of hardware and software components. For example, the pre-processor 28 can be implemented using one or more digital applications specific integrated circuits (ASICs), designed or configured to perform the functions of the pre-processor 28 as disclosed herein.

Figure 2:
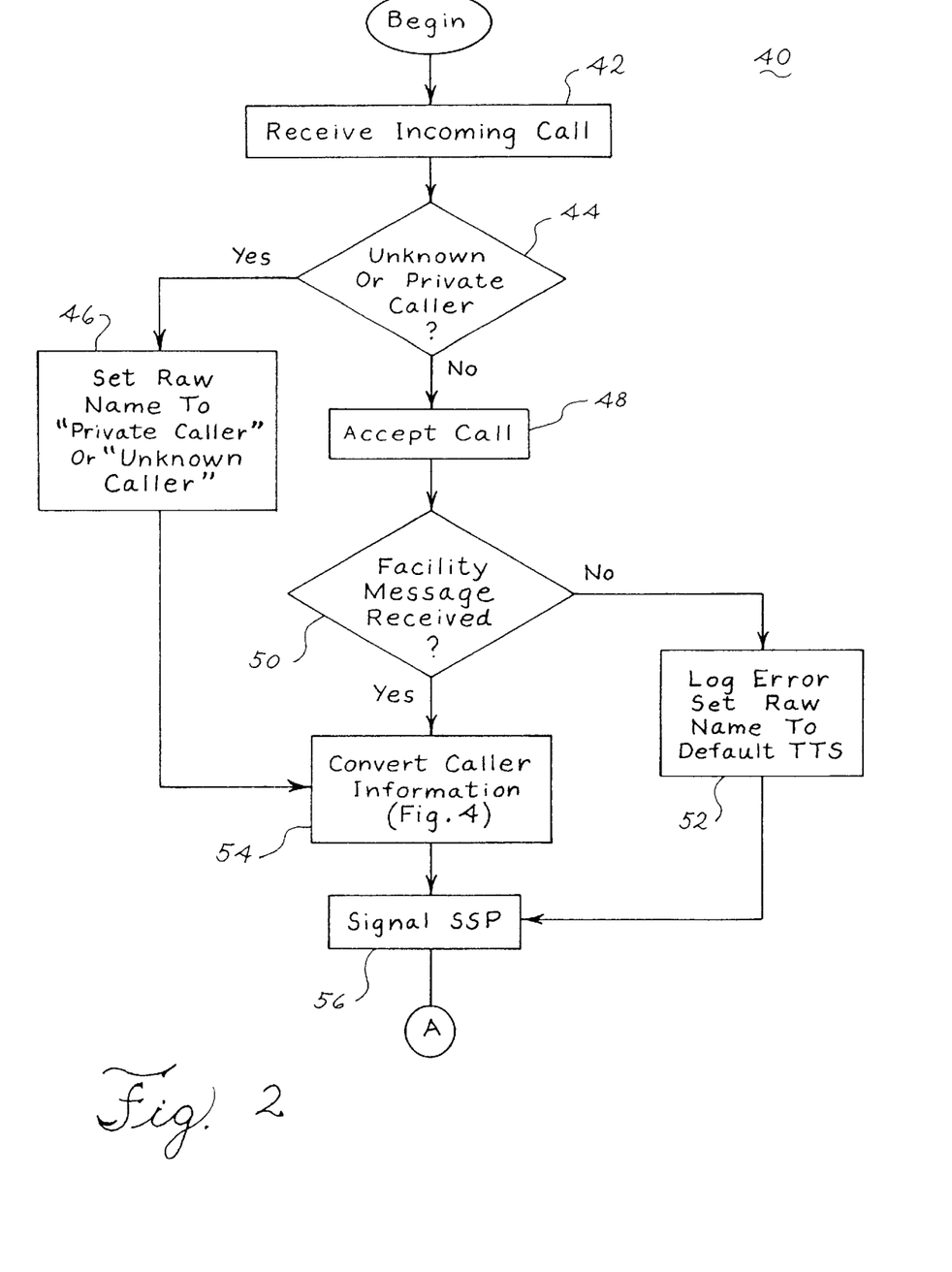
FIGS. 2 and 3 illustrate a flowchart describing a method of operating a service note/intelligent peripheral (SN/IP) in the telephone network shown in FIG. 1 in accordance with a first embodiment of the present invention.
Figure 3:
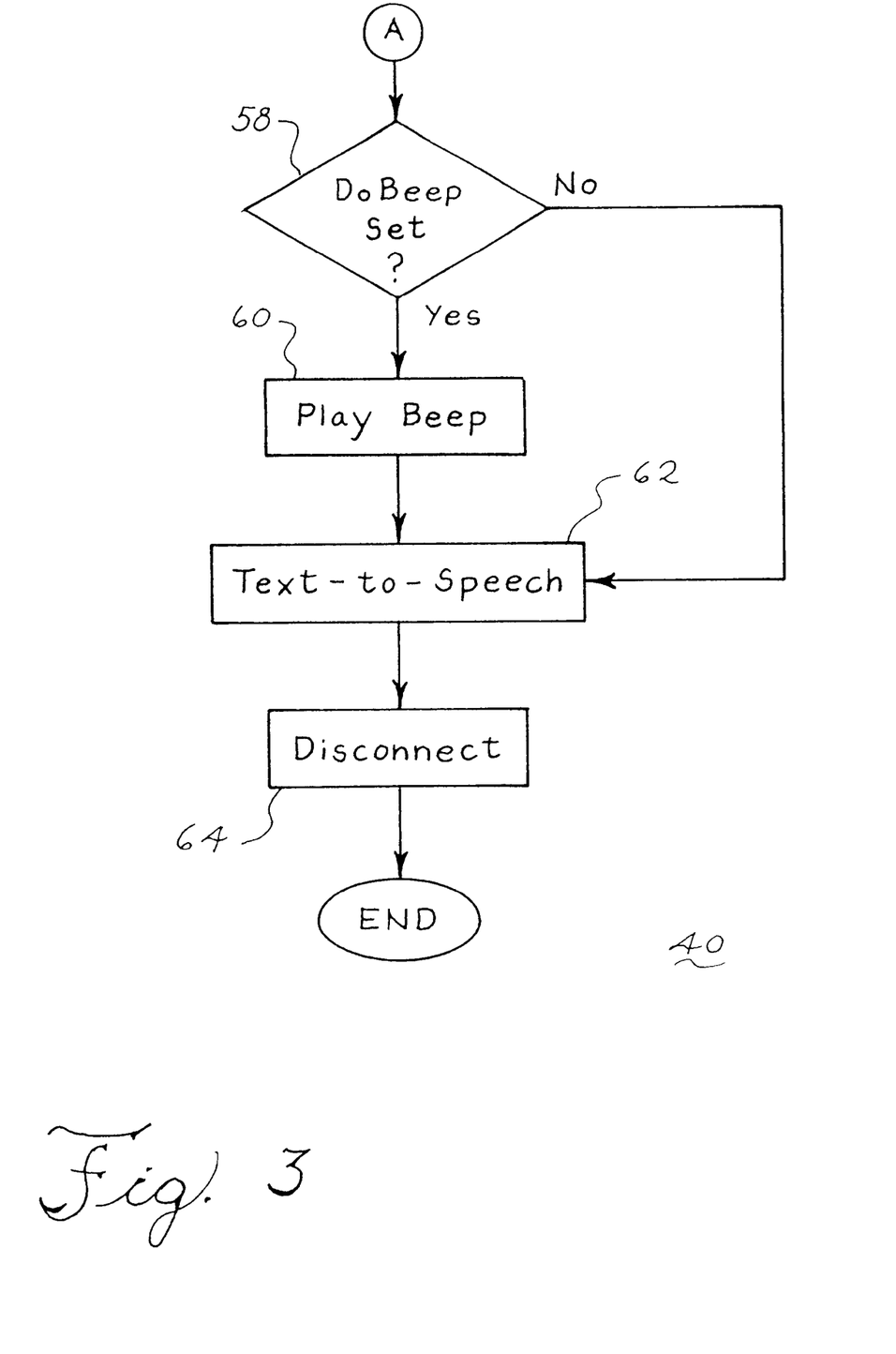

FIGS. 2 and 3 illustrate a flowchart describing a method 40 of operating the service note/intelligent peripheral (SN/IP) 24 in the telephone network shown in FIG. 1 in accordance with the first embodiment of the present invention. The method 40 can be implemented as a software program routine executable by the pre-processor 28.

The method 40 describes a talking call-waiting feature that presents audible caller information in conjunction with or in lieu of a conventional call-waiting "beep." Essentially, the talking call-waiting feature presents the audible caller information to a subscriber when the subscriber, already engaged in a call, receives a second incoming call from a third-party.

Turning now to the method, in step 42 an incoming call is received from the caller 12. Prior to connecting the call to the subscriber unit 22, the subscriber SSP 20 places a virtual call to the SN/IP 24.

Upon receiving the incoming call at the SN/IP 24, the pre-processor 28 checks the calling party ID parameters to determine whether the calling phone number is available or the number is marked "presentation restricted" (step 44). If the number is not available or marked "restricted", the pre-processor sets a software variable "raw name" to indicate an unknown caller or private caller, respectively (step 46). Conversely, if the incoming phone number is available and not restricted, the pre-processor 28 causes the SN/IP 24 to accept the call from the SSP 20 (step 48). In this context, "accepting" a call is an intermediate step before sending answer supervision to the SSP 20. In other words, it is equivalent to allowing ringing.

Next, in step 50, the pre-processor 28 determines whether an ISDN FACILITY message containing the textual caller information has been received from the local SSP 20. Textual caller information can be formatted to any predetermined database standard and typically includes the caller's name and phone number. In the example disclosed herein, the textual caller information received by the pre-processor is provided by a caller-ID with name (CNAM) database resident in the AIN. The format of the CNAM database restricts entries to a maximum of 15 characters, typically all in uppercase. Entries with names longer than 15 characters, particularly business names, are abbreviated and in some cases truncated.

A CNAM database is initially populated manually by an attendant from telephone listing information. Caller information entered into the CNAM database is abbreviated and truncated according to predefined sets of tables and rules.

The CNAM caller information is transferred from the SSP 20 to the SN/IP 24 using an ISDN FACILITY message. If the ISDN FACILITY message is not received within a predetermined time after accepting the call, the pre-processor 28 logs an error and sets the raw name variable to a default TTS value (step 52). However, upon successfully receiving the FACILITY message, the caller information is converted from the CNAM database format to another format suitable for text-to-speech synthesis (step 54). Details of this conversion process are provided by the method 70 shown in FIG. 4.

After conversion of the caller information is complete, the pre-processor 28 generates an answer call event. In this event, a signal is sent from the SN/IP 24 to the SSP 20, causing the SSP 20 to cut-through to the subscriber call in progress (step 56). A conventional SSP, such as the 5ESS switch available from Lucent Technologies, Inc., can provide a call-waiting feature permitting cut-through. After signaling the SSP 20 to cut-through, the pre-processor 28 waits to receive an acknowledgment from the SSP 20 indicating that the SSP 20 has successfully cut-through.

Upon receiving this indication, the pre-processor 28 determines whether to generate a conventional call-waiting "beep" prior to playing the audible caller information (step 58). If a software flag is set indicating that the call-waiting "beep" is to be generated, the pre-processor 28 causes the beep to be generated (step 60). Otherwise, the pre-processor 28 omits the "beep", and immediately performs the text-to-speech conversion generating the audible caller information to the subscriber unit 22 (step 62). After completing the text-to-speech generation, the pre-processor 28 will cause a disconnect signal to be sent to the subscriber SSP 20. This causes the SSP 20 to disengage from the SN/IP 24 service.

In addition to performing the above functions, the SSP 20 is equipped with a watchdog timer (not shown) to ensure that a malfunction in the SN/IP 24 does not indefinitely hang the talking call-waiting service provided to the subscriber unit 22. Watchdog timer functionality is customarily provided with commercially available SSPs, such as Lucent's 5ESS switch.

Figure 4:
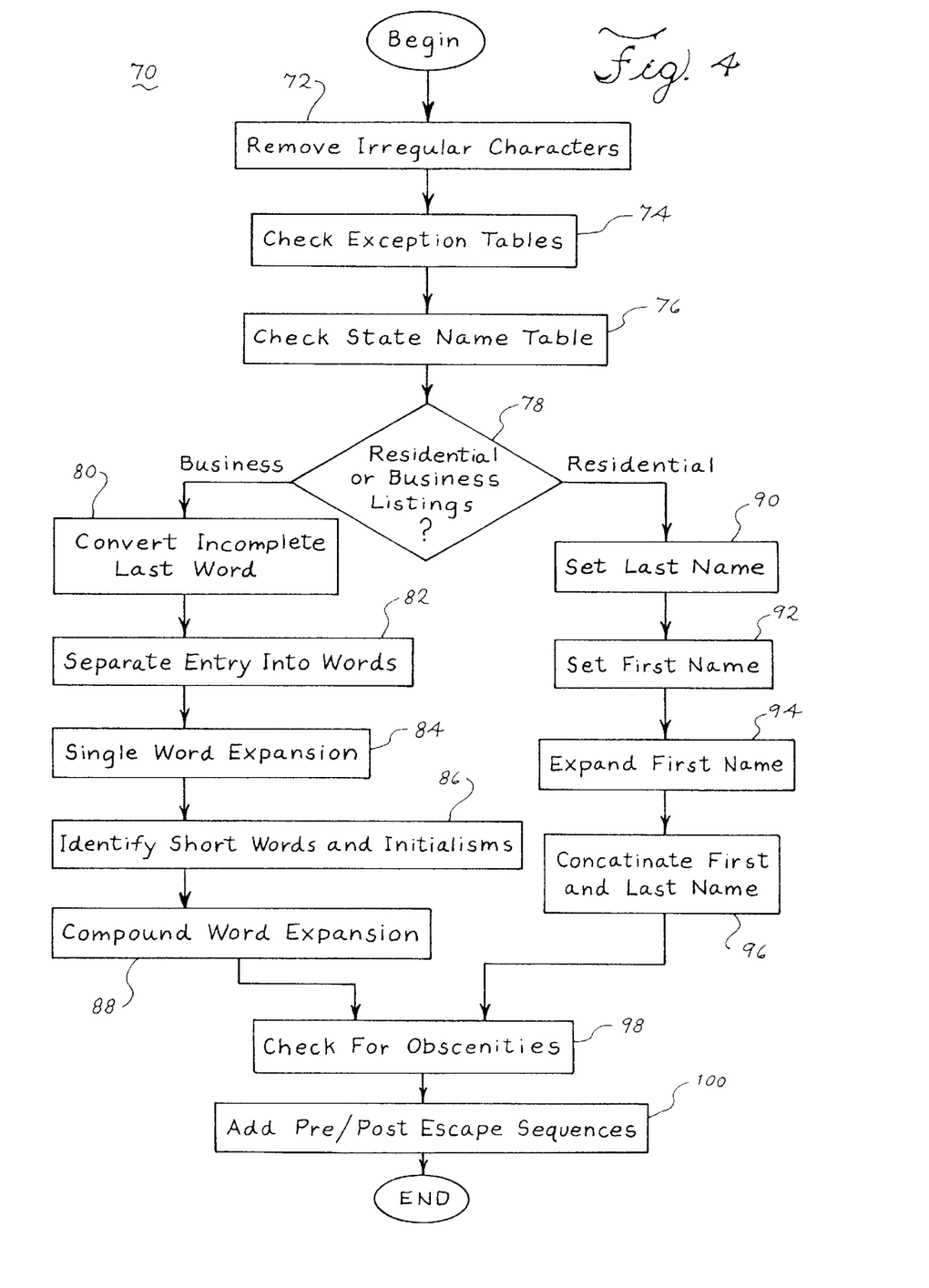
FIG. 4 illustrates a flowchart diagram describing a method of converting caller information from a compacted data format to an expanded data format suitable for text-to-speech synthesis by the telephone network or the telephone subscriber units shown in FIG. 1 in accordance with either a first or a second embodiment of the present invention.
Figure 5:
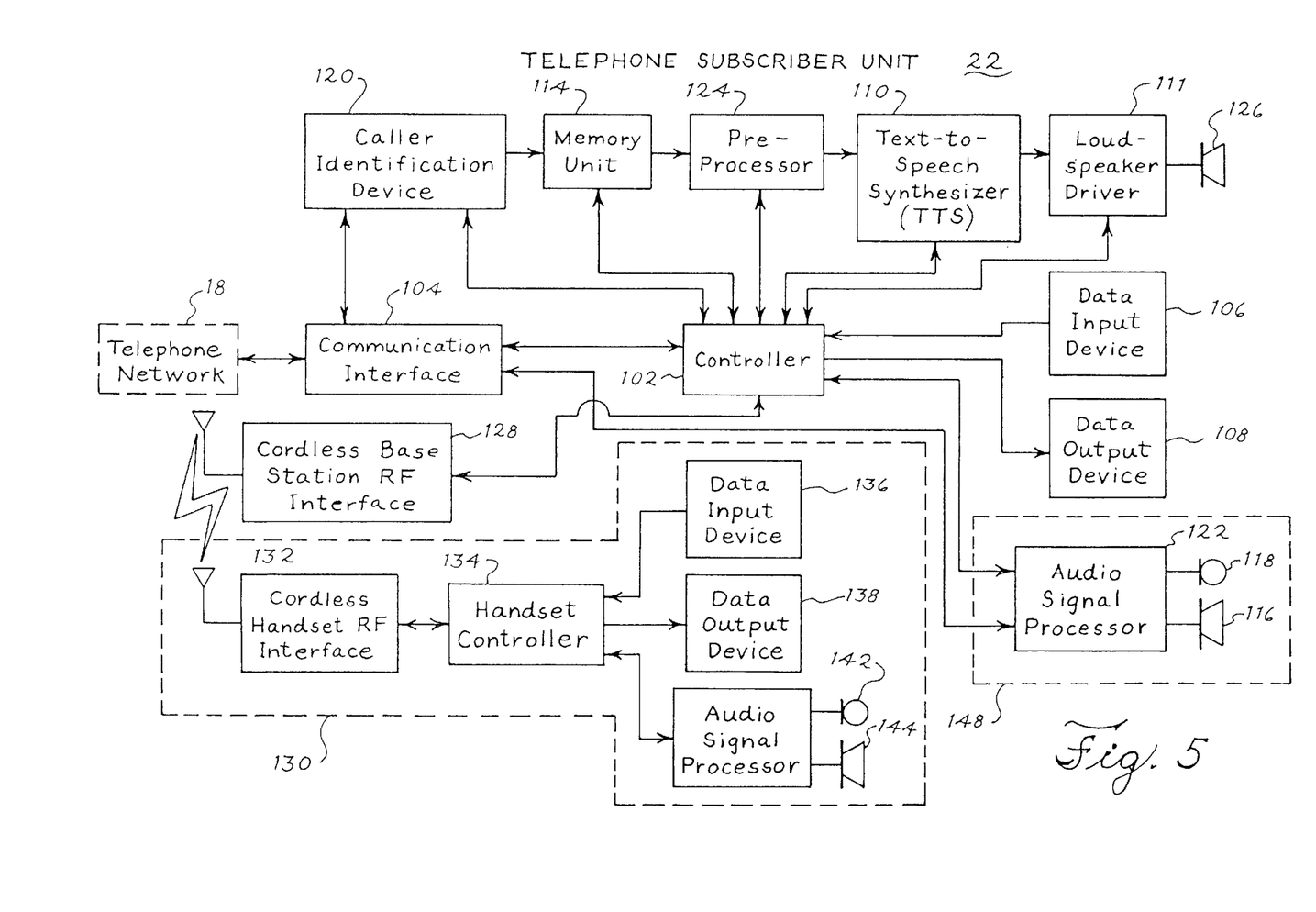
FIG. 5 illustrates a block diagram of a telephone subscriber unit shown in FIG. 1 in accordance with a second embodiment of the present invention.

FIG. 4 illustrates a flowchart diagram describing a method of converting caller information from a compacted data format to an expanded data format suitable for text-to-speech synthesis by the telephone network 18 or the telephone subscriber units 12 and 22 shown in FIG. 1 in accordance with either the first or the second embodiment of the present invention. The method 70 can be embodied in a set of rules stored as a software program in the pre-processor 28 in the SN/IP 24, as shown in FIG. 1, or in the pre-processor 124 in the telephone subscriber unit 22, as shown in FIG. 5. In the first embodiment, the method 40 will be discussed with reference to caller information formatted for storage in a CNAM database in the telephone network 18. In the second embodiment, the method 40 will be discussed with reference to the caller information being received by the telephone subscriber unit 22 from the telephone network 18 in the same format as stored in the CNAM database in the telephone network 18.

In step 72, raw CNAM data representing the caller information, received from the SSP 20 in the first embodiment or received by the telephone subscriber unit 22 in the second embodiment, is first scanned to remove any irregular characters. Throughout this disclosure, the terms "CNAM data" and "CNAM entry" have the same meaning and are used interchangeably. An irregular character is defined as any character other than the following:

A–Z a–z

0–9

, (comma)

' (apostrophe)

" " (space)

For example, if the CNAM entry comes in as "JOES TAV;RN," it would be converted to "JOES TAVRN".

Next, in step 74, the CNAM, received from the SSP 20 in the first embodiment or received by the telephone subscriber unit 22 in the second embodiment, is compared to an exceptions table that is stored in the SN/IP 24 in the first embodiment or stored the telephone subscriber unit 22 in the second embodiment, respectively. The exceptions table contains a plurality of entries, each corresponding to a caller 10-digit number and its associated CNAM entry. If incoming caller information, i.e., the 10-digit number and CNAM data taken together, corresponds to a table entry, then a predetermined output string will be generated and the remaining steps 76–100 of the conversion method 70 will be skipped. The exceptions table may be used to handle exceptions to normal pronunciations and unusual names. In this manner, surnames such as "Koch" will be correctly pronounced as "Cook" instead of "Kaach". If the incoming caller information does not match an entry in the exceptions table, the method proceeds to step 76.

In step 76, the pre-processor 28 will compare the CNAM data to a state name table. This table is provided so that common CNAM entries can be easily converted. For example, CNAM data does not always represent a caller's name, and instead, will indicate that the incoming call is from a private caller or an out-of-state call, for which there is no name information. Accordingly, the state name table can include entries for incoming CNAM data that indicates a call from any of the fifty states, or US territories, foreign countries, private, unknown, cellular and pay phone calls, or any predetermined text. If a match is found in this table, steps 78–100 are skipped.

The exceptions table and state name table may be implemented as data structures storable within the SN/IP 24 in the first embodiment or in the telephone subscriber unit 22 in the second embodiment. The SN/IP 24 in the first embodiment or in the telephone subscriber unit 22 in the second embodiment can include a software interface that permits these tables to be updated manually by an operator. If the incoming CNAM data does not correspond to an exceptions or state name table entry, the method 70 proceeds to step 78.

In step 78, a check is made to determine whether the CNAM data contains a residential or business listing. Business and residential listings are formatted differently in the CNAM database. Accordingly, separate sets of parsing rules may be provided for business and residential listings.

A comma included in a CNAM entry indicates a residential listing. Thus, in step 78, the pre-processor 28 may scan the characters included in the CNAM entry to determine the presence of a comma. If there is no comma, the CNAM entry may represent a business or entity name, and the method 70 proceeds to the steps 80–88 to convert the CNAM entry to a TTS format. Otherwise, the CNAM entry may represent a residential listing and steps 90–96 are performed to convert the CNAM entry to a TTS format.

In the case of a business listing, the pre-processor 28 in the first embodiment or pre-processor 124 in the telephone subscriber unit 22 in the second embodiment may first determine whether the last word in the CNAM entry is incomplete (step 80). As mentioned above, a CNAM entry contains a maximum of 15 characters. If the entry is 15 characters long, and the last word is one or two characters only, i.e., character 14 is a space and character 15 is a non-space, or character 13 is a space and characters 14 and 15 are non-spaces, then the last word is dropped and is not converted to the TTS format. Thus, it is not spoken to the subscriber. An exception to this rule is if characters 14 and 15 are "TH". If the final word is "THE" or "TH" then the word "THE" is placed at the beginning of the pre-processor output representing the caller information, and the trailing "TH" or "THE" at the end of the CNAM entry is removed.

Next, in step 82, the CNAM is converted into separate words. The maximum number of words in a single CNAM entry is seven. The words are indexed to maintain their order. For example, a CNAM entry "A A A CHGO MTR" would result in the following pre-processor variables being set:

WORD1="A"
WORD2="A"
WORD3="A"
WORD4="CHGO"
WORD5="MTR"

In step 84, individual words included in the CNAM entry are expanded from their abbreviated form. This can be accomplished by comparing each CNAM word to a predetermined business abbreviation table stored within the SN/IP 24. Common words used in business names are abbreviated upon entering them into the CNAM database. The business abbreviation table is a database including entries for each abbreviated word. A CNAM input word included in a business name is compared against this table, and if a match is found, the table entry is substituted for the abbreviated word. Following the above example, a CNAM entry containing the following words may be expanded as:

| CNAM WORD | EXPANDED OUTPUT |
| --- | --- |
| CHGO | CHICAGO |
| MTR | MOTOR |

After expanding individual words, single letter words are appended with a pause escape character so that the TTS 30 in the first embodiment or that the TTS 110 in the telephone subscriber unit 22 in the second embodiment will properly enunciate the single letter words.

In step 86, short words and acronyms are identified so that they are properly pronounced. An acronym is a "made up word" formed from pronounceable syllables. For example, UNICEF and NASA are two commonly used acronyms. To ensure that CNAM entries representing acronyms or short words are properly pronounced rather than spelled-out, a short word table is provided within the SN/IP 24 in the first embodiment or in the telephone subscriber unit 22 in the second embodiment. The short words table can be a data structure containing entries corresponding to respective two or three letter CNAM input words. If a match is found between a CNAM input and a short word table entry, the CNAM word is reformatted to be pronounced by the TTS as a single word. If the incoming CNAM word is not found in the short word table, the word is modified so that a pause occurs between each letter of the word when it is synthesized by the TTS 30 in the first embodiment or in the TTS 110 in the telephone subscriber unit 22 in the second embodiment.

In step 88, compound CNAM words are expanded. A compound CNAM word includes two or more individual words. For example, the CNAM entry "HOFF EST HS", the pre-processor would convert this entry to "HOFFMAN ESTATES HIGH SCHOOL." This compound word expansion can be accomplished using a compound business abbreviation table. Each entry in this table corresponds to a multiple word CNAM expansion. If a match is found, the substituted TTS words are used. Alternatively, compound word expansion can be accomplished using a predetermined set of matching rules and the business abbreviation table. The matching rules compare various combinations of words in the CNAM entry to combinations of entries in the abbreviation table.

Turning now to the residential listings, steps 90–96 illustrate a process of converting residential listings to a format suitable for text-to-speech synthesis. In step 90, the last name of the caller is set to the CNAM sub-string from the beginning of the CNAM entry through to the comma in the CNAM entry. For example, CNAM entry "MC BLAIN, THOMAS" the last name would be set to "MC BLAIN."

In step 92, the first name of the caller is determined. First, the pre-processor 28 in the first embodiment or the pre-processor 124 in the telephone subscriber unit 22 in the second embodiment determines whether a first name is present by searching for characters to the right of the comma in the CNAM entry. If no characters are present, the first name variable is set to null. If characters are present, the pre-processor 28 in the first embodiment or the pre-processor 124 in the telephone subscriber unit 22 in the second embodiment checks to determine whether the first name is incomplete. If the entry is 15 characters long, and characters 14 and 15 are not spaces, then it is assumed that the first name is incomplete and only the initial of the first name will be enunciated by the TTS 30 in the first embodiment or by the TTS 110 in the telephone subscriber unit 22 in the second embodiment. However, if there are multiple names in the first name field of the CNAM entry, the middle name will be omitted and the full first name will be pronounced. Accordingly, the first name is set to the first character occurring after the comma through the next space.

In step 94, the first name is expanded. A residential abbreviation table is provided within the SN/IP 24 in the first embodiment or in the telephone subscriber unit 22 in the second embodiment. Typically, common first names are abbreviated upon entering them into the CNAM database. The residential abbreviation table includes entries for each abbreviated name. The CNAM input representing a first name is compared against this table, and if a match is found, the table entry is substituted for the abbreviated CNAM input. For example:

| CNAM INPUT | EXPANDED NAME |
|---|---|
| JOS | JOSEPH |

In step 96, the last name and first name are concatenated together, forming a variable representing the complete name.

In step 98, the expanded CNAM entry is checked against an obscenities table to determine whether the expanded name would result in an embarrassing or offensive pronunciation. If a match is found in this table, a default output is generated for that entry such as "Unknown Caller." In addition, expanded CNAM entry can be checked against a Name Pronunciation Exceptions table. This table includes a list of predetermined names, such as ethnic and non-English names, and their corresponding correct pronunciations, as represented in a TTS compatible format. If an expanded CNAM entry is found in the table, the correct pronunciation is substituted for the expanded name.

In step 100, pre-post escape sequences can be pre-pended and appended to the reformatted caller information. Typically, these escape sequences include symbols causing the TTS 30 in the first embodiment or the TTS 110 in the telephone subscriber unit 22 in the second embodiment to generate silent pauses between initial and last names of residential entries and between single letters in business entries. The pauses are ordinarily on the order of 20 milliseconds.

In summary of the first embodiment of the present invention, the method 70 and the system 10 presents spoken caller information to the telephone subscriber unit 22. The method 70 and the system 10 converts caller information from an abbreviated format to an expanded format more suitable for text-to-speech synthesis to significantly improve the overall quality of the voiced caller information presented to the telephone subscriber unit 22. Moreover, the method 40 and the system 10 permits pre-existing caller-ID databases to be integrated with commercially available text-to-speech synthesizers in a cost-effective manner.

In summary of the second embodiment of the present invention, the method 70 and the telephone service subscriber 22 converts received textual caller ID information to audible caller ID information. The method 70 and the telephone service subscriber 22 convert caller ID information from an abbreviated format to an expanded format for more suitable for text-to-speech synthesis to significantly improve the overall quality of the voiced caller information generated by the telephone service subscriber 22.

FIG. 5 illustrates a block diagram of the telephone subscriber unit 22 shown in FIG. 1 in accordance with the second embodiment of the present invention. The telephone subscriber unit 22 generally includes a controller 102, a communications interface circuit 104, data input device 106, a data output device 108, a text-to-speech signal synthesizer (TTS) 110, a loudspeaker driver 111, a memory unit 114, an earpiece speaker 116, a microphone 118, a caller identification unit 120, an audio signal processor 122, a pre-processor 124, a loudspeaker 126, a cordless base station radio frequency(RF) interface and a cordless handset 130. The cordless handset generally includes a cordless handset RF interface 132, a handset controller 134, a data input device 136, a data output device 138, an audio signal processor 140, a microphone 142, an earpiece speaker 144, and a loudspeaker 146. The controller 102 is coupled to the communications interface circuit 104, the data input keys 106, the display 108, the TTS 110, the memory unit 112, the caller identification unit 120, the audio signal processor 122, the pre-processor 124, the cordless base station RF interface.

In operation, the telephone subscriber unit 22 communicates with the telephone network 18 via the communication interface 104. The telephone subscriber unit 22 preferably receives caller ID information, including the calling party's name and phone number. The controller 102 controls all of the blocks, except for the cordless handset 130, shown in FIG. 5. The caller identification device 120 receives the caller ID information from the communication interface 104, as is well known in the art. At this point, the caller ID information is in the format of data signals represented as a textual format in the data output device 108. The caller information device 120 stores the caller ID information in the memory unit 114. The pre-processor 124 processes the stored caller ID information according to method 70 in FIG. 4 or any other method. The pre-processor 124 converts the stored caller ID information from a first textual data format to a second textual data format suitable for use by the TTS 110. The TTS 110 converts the textual data format in the second format from the pre-processor 124 to an electrical speech signal. The loudspeaker driver 111 amplifies the electrical speech signal to drive the loudspeaker 126. The loudspeaker 126 converts the electrical speech signal into an acoustic signal having an audible level appropriate for listening to by the called party. The data input device 106 permits the called party to input data into the telephone subscriber unit 22 to control the unit 22. The data output device 108 permits the called party to receive data from the telephone subscriber unit 22. The audio circuitry 148 permits the called party to input voice signals via the microphone 118 or listen to acoustic signals via the earpiece speaker 116. Optionally, when the telephone subscriber unit 22 is implemented as a cordless telephone, the controller 102 also controls the cordless base station interface 128 for communicating with the cordless handset.

In the second embodiment of the present invention, the telephone subscriber unit 22 is a cordless telephone and includes all of the blocks listed and shown in FIG. 5. In the cordless telephone, the cordless base station RF interface 128 and the cordless handset RF interface each includes a transmitter, a receiver and a frequency synthesizer (each not shown in either interface) operating at 49 MHz or 900 MHz, as is typical with cordless telephones. With a cordless telephone, the synthesized speech announcing the caller's ID information may be presented to the called party by either the base station or the cordless handset. Preferably, if the cordless handset is detected to be positioned in a cradle of the base station, then the synthesized speech is announced using the loudspeaker 126 in the base station to conserve the battery power in the cordless handset 130. However, if the cordless base station detects that the battery power in the cordless handset is too low to provide enough energy to announce the calling party's identification or detects that the cordless handset is turned off, then the synthesized speech is announced using the loudspeaker 126 in the base station. Alternatively, if the cordless handset is detected to be positioned out of the cradle of the base station, then the synthesized speech is announced using the loudspeaker 146 in the cordless handset 130. This operation assumes that when the cordless handset 130 is taken out of the cradle of the base station, then the user has the cordless handset 130 nearby the user but away from the base station, such as outside a house or in a garage. Hence, the synthesized speech is announced using the loudspeaker 146 in the cordless handset 130 to provide voiced caller ID information to the user at a site remote from the base station. Preferably, the voiced caller ID information is a name of the calling party and may or may not include the caller's telephone number. The voice announcement of the calling party's name may or may not use the steps of method 70 in FIG. 4, depending on the sophistication, memory size, processing power, etc. of the cordless telephone.

Alternatively, the telephone subscriber unit 22 may be a radio telephone, such as a cellular telephone. The radio telephone includes all of the blocks listed and shown in FIG. 5, except the cordless base station RF interface 128 and the cordless handset 130 which are needed to implement the cordless telephone. The cellular telephone may operate according to any of the several analog or digital signaling standards such as, for example, time division multiple access (TDMA), code division multiple access (CDMA) or Group System Mobile (GSM). Voice announcement of a caller's name in a radio telephone is particularly advantageous today when most public places, such as restaurants and theaters, prohibit radio telephones because of their disturbing ringing sounds. This has caused some radio telephone manufacturers to include vibrating devices to generate a silent vibrating alert upon the detection of an incoming call. However, in a place where people are already speaking, such as in a restaurant, a voice announcement of an incoming call would be much less disturbing and maybe not even noticed by others. To answer the incoming call the called party may have to leave the location so as not to disturb others during an entire phone conversation.

Alternatively, the telephone subscriber unit 22 may be a landline telephone without cordless capabilities. The landline telephone includes all of the blocks listed and shown in FIG. 5, except the cordless base station RF interface 128 and the cordless handset 130 which are needed to implement the cordless telephone.

Alternatively, the telephone subscriber unit 22 may be implemented as an internet telephone. The landline telephone includes all of the blocks listed and shown in FIG. 5, except the cordless base station RF interface 128 and the cordless handset 130 which are needed to implement the cordless telephone. The internet telephone is preferably incorporated within a desktop personal computer, but may also be a stand alone unit.

Still alternatively, the telephone subscriber unit 22 may be a caller ID unit having a housing separate from a telephone. The caller ID unit includes all of the blocks listed and shown in FIG. 5, except the cordless base station RF interface 128 and the cordless handset 130, which are needed to implement the cordless telephone, and audio circuitry 148, which is needed for a close coupled handset operation. In this case, the caller ID unit may or may not include its own audio circuitry, such as the loudspeaker driver 111 and the loudspeaker 112, to generate the synthesized audio signals depending on whether the caller ID unit and/or another device, such as the landline telephone, is designed to cooperate with the caller ID device to generate the synthesized audio signals. Preferably, the caller ID unit would include its own audio circuitry and be produced as a separate stand alone unit to be compatible with the many of the conventional landline telephones presently available with subscribing customers. In the caller ID unit, only the communication interface 104, the caller identification device 120, the memory unit 114, the controller 102, the data input device 106 and the data output device 108 are represented by similar blocks having similar functions as is known in Ameritech's 50 memory caller ID with name and number, having model number AM-2000, herein incorporated by reference.

The communications interface circuit 104 communicates voice, data and/or video signals between the telephone subscriber unit 22 and the telephone subscriber unit 12 via the telephone network 18. When the telephone subscriber unit 22 is a landline telephone, a cordless telephone, or a caller ID device, the communications interface circuit 104 typically includes a tip and ring circuit, as is well known in the art. Alternatively, when the telephone subscriber unit 22 is a radio telephone, the communications interface circuit 104 typically includes a radio frequency (RF) transmitter, a RF receiver and a radio frequency synthesizer (each not shown), as is well known in the art. Still alternatively, when the telephone subscriber unit 22 is an internet telephone, the communications interface circuit 104 typically includes an analog modem coupled to a conventional landline telephone line which is in turn coupled to the telephone network 18, a digital subscriber modem coupled to a digital subscriber line which is in turn coupled to the telephone network 18, or a cable subscriber modem coupled to a coaxial cable which is in turn coupled to the telephone network 18.

The data input device 106 and the data input device 136 generate data signals for input to the controller 102 and the controller 134, respectively, responsive to manual actuation thereof by a user of the telephone subscriber unit 22. The data input device 106 generally includes, but is not limited to, a traditional three by four keypad or a touchscreen input device, and smart or control keys. When the telephone subscriber unit 22 is a landline telephone, a radio telephone, or a cordless telephone, the traditional three by four keypad or the touchscreen input device is typically located on a front face of the telephone's housing and the smart or control keys are located on one or both of the front face and a side face of the telephone's housing. Alternatively, when the telephone subscriber unit 22 is a caller ID device, the data input keys 106, representing, for example, "erase" and "review" functions are typically located on a front face of the caller ID device. Still alternatively, when the telephone subscriber unit 22 is an internet telephone, the data input keys 106 are typically located on a keyboard separate from or integrated with the internet telephone.

The data output device 108 and the data output device 138 each receive data signals from the controller 102 and the controller 134, respectively, to present visual information for the called party on the data output device 108. Typically the data output device 108 is a display may be implemented with any type of display technology including, but not limited to, liquid crystal displays (LCD), light emitting diode displays (LED), liquid plasma displays (LPD), vacuum florescent displays (VFD) and cathode ray tubes (CRT). When the telephone subscriber unit 22 is a radio telephone, landline telephone, cordless telephone or a caller ID unit, the display 108 is typically located on a front face of the housing. Still alternatively, when the local telephone is an internet telephone, display 108 is typically a thin film transistor (TFT) LCD or a CRT either separate from or integral to the internet telephone. Preferably, the display 208 presents caller ID information, such as the caller's name and telephone number. The caller's name and telephone number may be displayed on two separate lines of the display, as known with Ameritech's 50 memory caller ID with name and number, having model number AM-2000.

The pre-processor 124 preferably represents a computer memory having pre-processing software associated therewith. Alternatively, the pre-processor 124 may be implemented fully in hardware, such as a digital signal processor (DSP). The pre-processing software preferably implements, in whole or in any combination, computer code according to the method 70 described in FIG. 4. Alternatively, the pre-processing software may advantageously separate alphabetical characters from numeric characters in a compressed string of alphanumeric characters. In this case, the separation is preferably made based on predetermined field locations allocated for the alphabetical characters and the numeric characters. The separation may also be based on detecting a change in the character string from the alphabetical characters to numeric characters. After pre-processing of this type, the pre-processor may either continue to implement the method 40 of FIG. 4 or transmit the separated data as is to the TSS 110. Therefore, the pre-processor 124 may be of a basic design capable of only converting the format of textual data representing numeric data, such as a telephone number, or a somewhat more advanced design capable of converting the format of textual data representing alphanumeric information, such as a calling party's name and telephone. The level of design of the pre-processor 124 depends upon such engineering tradeoffs such as the power of the processor and the complexity of the pre-processing software.

The text-to-speech synthesizer (TSS) 110 preferably represents a computer memory having text-to-speech software associated therewith. Alternatively, the text-to-speech synthesizer may be implemented fully in hardware, such as a digital signal processor (DSP). The text-to-speech synthesizer 110 may be of a basic design capable of only converting textual data to speech signals representing numeric data, such as a telephone number, or a somewhat more advanced design capable of converting textual data to speech signals representing alphanumeric information, such as a calling party's name and telephone. The level of design of the text-to-speech synthesizer 110 depends upon such engineering tradeoffs such as the power of the processor and the complexity of the text-to-speech software.

The memory unit 114 generally represents a medium for storing data or a text signal. Preferably, the memory unit 114 stores the textual data associated with the caller ID information, such as the caller's name and telephone number. The memory unit 114 also stores the data bases associated with the method 70 discussed in FIG. 4. The memory unit 114 may be implemented with any type of memory technology including, but not limited to, analog and digital memory technology.

The caller identification device 120 generally represents a way for the local party to electronically determine a representation of the identity of the calling party, such as the calling party's name and/or phone number. The identity of the remote party caller may be provided by a telephone network service provider associated with the telephone network 18 and decoded by the caller identification unit 120 or may be determined by the caller identification unit 120 without the assistance of the telephone network service provider. The caller identification unit 120 may be implemented either integral to or separate from a telephone, as is well known in the art.

The controller 102, the loudspeaker driver 111, and the loudspeaker 126 may be implemented, as is well known in the art.

In summary of FIG. 5 for the second embodiment of the present invention, the telephone subscriber unit 22, may take various forms depending on the type of equipment desired by the subscribing customer, the complexity of the engineering design, the sophistication and power of the pre-processor 124 and the TSS 110, etc. A particular advantage of FIG. 5 is that the pre-processing of the textual data from the first data format to the second data format and the text-to-speech conversion occurs in the telephone subscriber unit 22. Therefore, the subscribing customer can purchase equipment similar to the telephone subscriber unit 22 to generate a voice announcement of received caller ID information, without reliance on the telephone network 18 to generate the voice announcement. Hence, while the first embodiment implements a solution in a telephone network, the second embodiment implements a solution in a telephone subscriber unit.

Hence, while the present invention has been described with reference to various illustrative embodiments thereof, the present invention is not intended that the invention be limited to these specific embodiments. Those skilled in the art will recognize that variations and modifications can be made without departing from the spirit and scope of the invention as set forth in the appended claims.

We claim:

1. A cordless telephone subscriber unit comprising:
   a cordless handset having an earpiece speaker and a loudspeaker;
   a cordless base station unit adapted to communicate radio frequency signals with the cordless handset and including:
   a communication interface adapted to receive a caller identification signal, including at least one of a name and a telephone number of a calling party, from a telephone network during an incoming call;
   a caller identification device coupled to the communication interface and adapted to detect the caller identification signal;
   a pre-processor coupled to the caller identification device and adapted to convert the caller identification signal from a first data format to a second data format;
   a text-to-speech synthesizer coupled to the pre-processor and adapted to convert the caller identification signal to a synthesized speech signal;
   a loudspeaker coupled to the text-to-speech synthesizer and adapted to convert the synthesized speech signal into an audible speech signal; and
   a controller coupled to the communication interface, the caller identification device, the speech synthesizer and the loudspeaker and adapted to cause at least one of the name and the telephone number of the calling party to be announced as an audible speech signal in real time during the incoming call over one of the loudspeaker of the cordless base station, the loudspeaker of the cordless handset and the earpiece speaker of the cordless handset.

2. A cordless telephone subscriber unit according to claim 1 wherein the controller causes the name of the calling party to be announced over the loudspeaker of the cordless base station when the cordless handset is mechanically coupled to the cordless base station, and to be announced over the loudspeaker of the cordless handset when the cordless handset is not mechanically coupled to the cordless base station.

3. A cordless telephone subscriber unit according to claim 2 wherein the controller causes the name of the calling party to be announced over the loudspeaker of the cordless base station when the cordless handset is not mechanically coupled to the cordless base station responsive to a determination by the cordless base station that the cordless handset is either turned off or has a low battery power thereby lacking energy to announce the name of the calling party over the loudspeaker of the cordless handset.

4. The invention of claim 1, wherein the pre-processor comprises a predetermined set of rules for converting the caller identification signal from the first format to the second format.

5. The invention of claim 1, wherein the pre-processor comprises a first set of rules for converting a business caller identification signal from the first format to the second format and a second set of rules for converting a residential caller identification signal from the first format to the second format.

6. The invention of claim 1, wherein the pre-processor comprises an abbreviation expansion table.

7. The invention of claim 1, wherein the pre-processor comprises an exceptions table.

* * * * *

UNITED STATES PATENT AND TRADEMARK OFFICE
CERTIFICATE OF CORRECTION

PATENT NO.     : 6,466,653 B1
DATED          : October 15, 2002
INVENTOR(S)    : Mendel K. Hamrick et al.

It is certified that error appears in the above-identified patent and that said Letters Patent is hereby corrected as shown below:

<u>Title page,</u>
Item [57], ABSTRACT,
Line 6, immediately after "(114)" insert -- . -- (period).

Signed and Sealed this

Fifth Day of August, 2003

JAMES E. ROGAN
*Director of the United States Patent and Trademark Office*